(12) United States Patent
Konno et al.

(10) Patent No.: US 6,742,940 B2
(45) Date of Patent: Jun. 1, 2004

(54) SHADING DEVICE AND LENS BARREL

(75) Inventors: Norikatsu Konno, Shinagawa-ku (JP); Hitoshi Imanari, Yokohama (JP); Hideo Kanno, Chiba (JP); Kazumitsu Takezawa, Yokohama (JP)

(73) Assignee: Nikon Corporation, Tokyo (JP)

( * ) Notice: Subject to any disclaimer, the term of this patent is extended or adjusted under 35 U.S.C. 154(b) by 0 days.

(21) Appl. No.: 10/230,023

(22) Filed: Aug. 29, 2002

(65) Prior Publication Data

US 2003/0091346 A1 May 15, 2003

(30) Foreign Application Priority Data

Aug. 30, 2001 (JP) .......................... 2001-261397
Jan. 15, 2002 (JP) .......................... 2002-005869

(51) Int. Cl.⁷ .......................... G03B 17/04; G03B 11/04
(52) U.S. Cl. .......................... 396/349; 396/534
(58) Field of Search .......................... 396/348, 349, 396/534

(56) References Cited

U.S. PATENT DOCUMENTS

| | | | | |
|---|---|---|---|---|
| 577,891 A | * | 3/1897 | Turner | 396/349 |
| 1,936,860 A | * | 11/1933 | Ruberg | 396/349 |
| 2,143,125 A | * | 1/1939 | Headlee | 396/349 |
| 2,880,902 A | * | 4/1959 | Owsen | 396/348 |
| 5,878,295 A | * | 3/1999 | Katagiri et al. | 396/348 |
| 6,339,682 B1 | * | 1/2002 | Suzuki et al. | 396/349 |

FOREIGN PATENT DOCUMENTS

| | | |
|---|---|---|
| JP | 06-002309 | 11/1994 |
| JP | A 7-181579 | 7/1995 |
| JP | A 8-304903 | 11/1996 |
| JP | A 9-145976 | 6/1997 |
| JP | A 9-152541 | 6/1997 |
| JP | Y2 2582660 | 7/1998 |
| JP | A 11-64702 | 3/1999 |
| JP | A 11-84198 | 3/1999 |
| JP | A 2000-171677 | 6/2000 |

* cited by examiner

Primary Examiner—Christopher Mahoney
(74) Attorney, Agent, or Firm—Oliff & Berridge, PLC

(57) ABSTRACT

A shading device employed in a lens barrel having a plurality of lens groups includes a plurality of substantially tubular shading members provided between a first lens group and a second lens group that move relative to each other along the optical axis and overlap each other along the optical axis so as to allow the shading device to achieve a telescopic function.

27 Claims, 9 Drawing Sheets

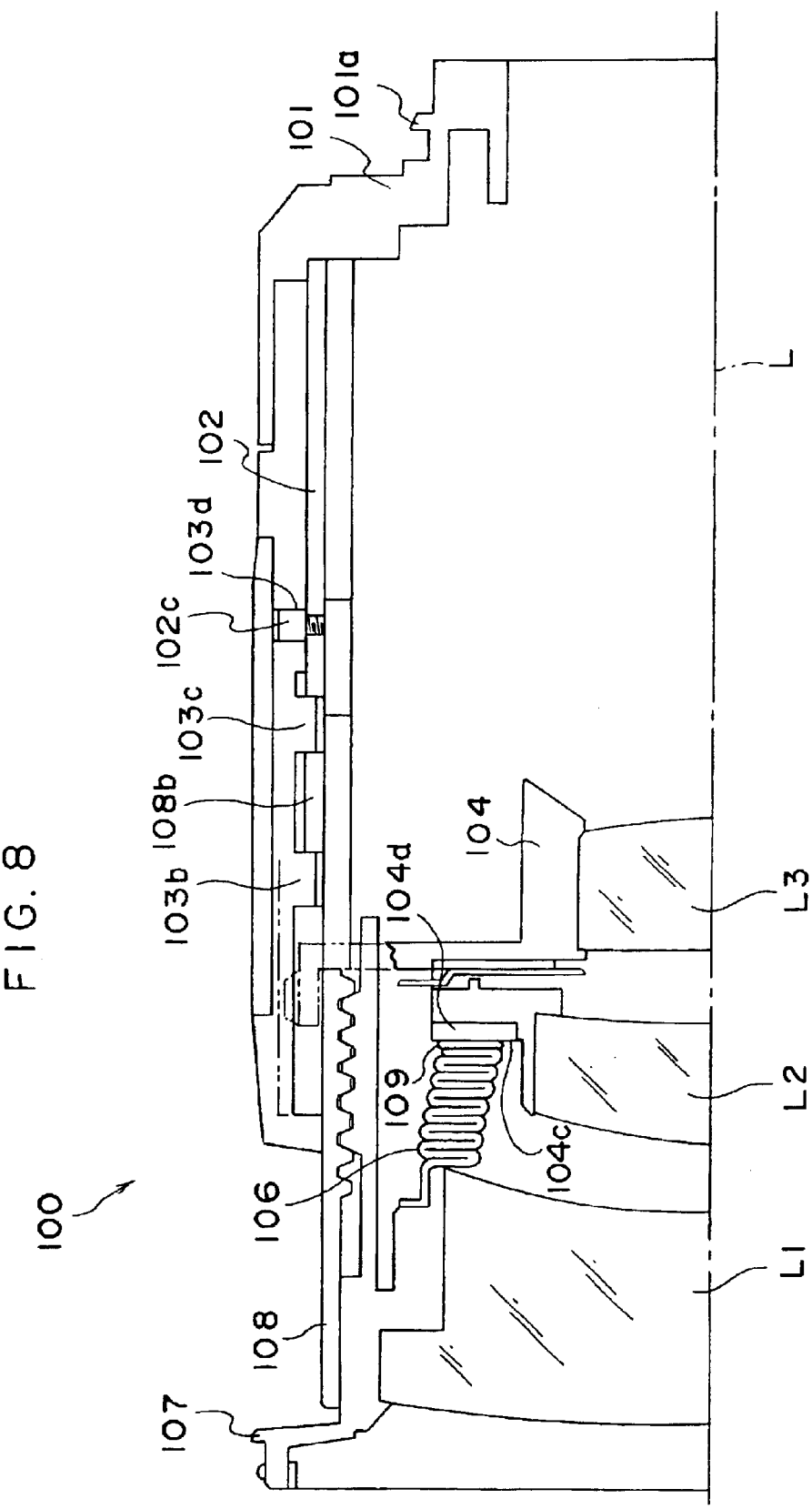

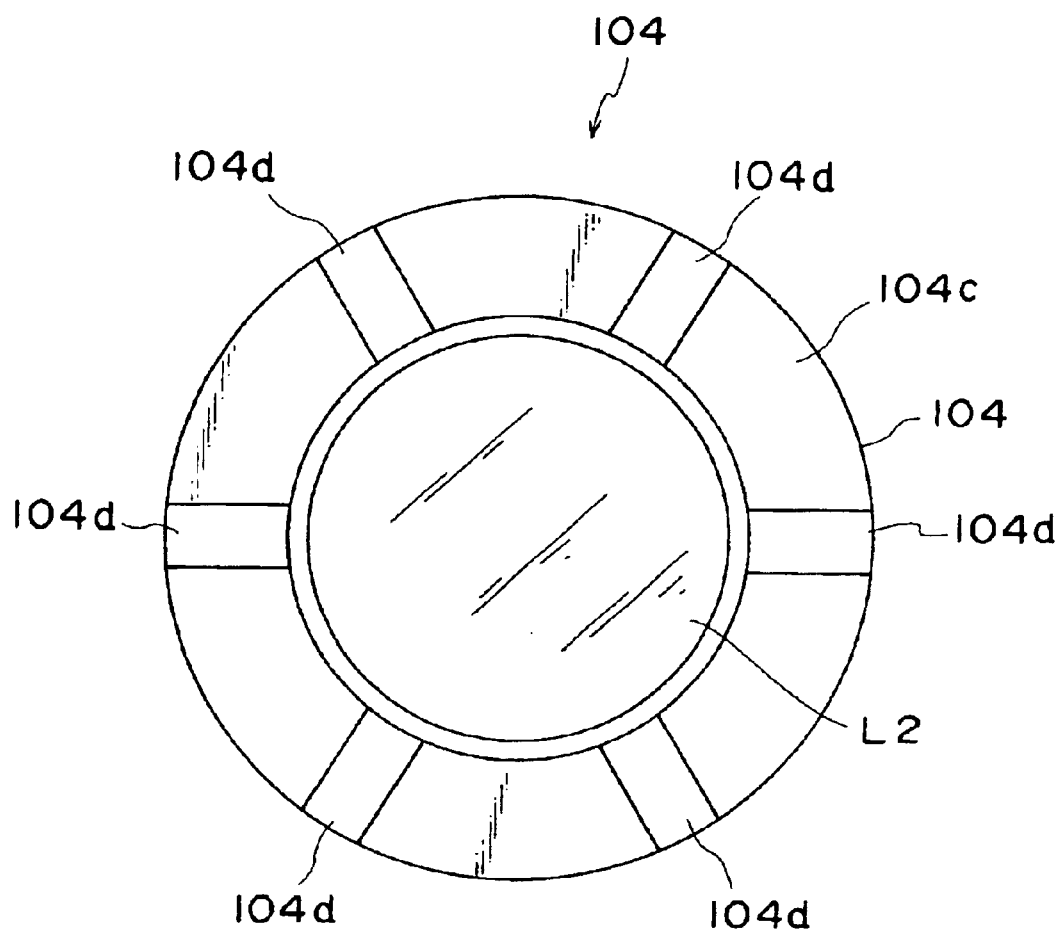

1

SHADING DEVICE AND LENS BARREL

INCORPORATION BY REFERENCE

The disclosures of the following priority applications are herein incorporated by reference:
Japanese Patent Application No. 2001-261397 filed Aug. 30, 2001
Japanese Patent Application No. 2002-005869 filed Jan. 15, 2002

BACKGROUND OF THE INVENTION

1. Field of the Invention

The present invention relates to a shading device that is employed in a lens barrel mounted at a camera or the like and prevents leakage of light and a lens barrel that employs the shading device.

2. Description of the Related Art

Shading devices that prevent light leakage in the related art include the device disclosed in Japanese Laid-open Patent Publication No. H 09-152541. The shading device, achieved by mounting an accordion-folding shading member at two lens groups housed in the lens barrel, prevents leakage of light from occurring between the lens groups. When these lens groups are caused to move relative to each other for focal adjustment or zooming, the accordion-folding member expands/contracts in conformance to the movement of the lens groups.

However, there is a problem in that when the lens groups rotate around the optical axis for focal adjustment or zooming, the accordion-folding member becomes twisted and, for this reason, the two ends of the accordion-folding member cannot be directly secured to the lens groups.

SUMMARY OF THE INVENTION

An object of the present invention is to provide a shading device capable of preventing leakage of light with a high degree of reliability during movement of the lens groups and a lens barrel having this shading device.

A shading device according to the present invention, which is employed in a lens barrel having a plurality of lens groups, includes a plurality of substantially tubular shading members provided between a first lens group and a second lens group that move relative to each other along the optical axis and overlap each other along the optical axis so as to allow the shading device to achieve a telescopic function.

It is desirable that the shading members include a first shading member having one end thereof secured to the first lens group, a second shading member having one end thereof secured to the second lens group and at least one middle shading member provided between the first shading member and the second shading member. In addition, retaining portions should be provided at the unsecured end of the first shading member, the unsecured end of the second shading member and the two ends of the middle shading member.

The shading members may each be formed as a tube having a substantially circular-conical shape and, in such a case, the shading members should be arranged so that the vertices of the individual circular cones face the same direction. In this structure, the area over which the internal circumferential surface on the smaller-diameter side of a shading member overlaps the external circumferential surface on the larger-diameter side of an adjacent shading member may function as a retaining portion.

It is desirable that the shading device as a whole achieve a substantially circular-conical tubular form constituted with the plurality of shading members and that the larger-diameter side of the shading device be set either at the first lens group or the second lens group having the larger lens external diameter. Alternately, the smaller-diameter side of the shading device may be set toward the subject along the optical axis.

It is desirable that at least either the first lens group or the second lens group move while rotating around the optical axis and that the plurality of shading members be capable of rotating while sliding against one another.

It is desirable that the internal diameter of the unsecured end of the first shading member be set smaller than the external diameter of the middle shading member at the end overlapping the first shading member and that the external diameter of the unsecured end of the second shading member be set larger than the internal diameter of the middle shading member at the end overlapping the second shading member.

As the distance between the first lens group and the second lens group becomes smaller, the second shading member is inserted further into the middle shading member and the middle shading member is inserted further into the first shading member to contract the shading device, whereas as the distance between the first lens group and the second lens group becomes larger, the second shading member is pulled out of the middle shading member and the middle shading member is pulled out of the first shading member to allow the shading device to expand.

When the distance between the first lens group and the second lens group is at its smallest, the length of the shading device along the optical axis may become substantially equal to the length of one of the shading members along the optical axis.

A shading device according to the present invention, which is employed in a lens barrel having a plurality of lens groups, includes a light leakage preventing member having bellows provided between a first lens group and a second lens group that move relative to each other along the optical axis, and one end of the light leakage preventing member is secured to the first lens group, whereas another end of the light leakage preventing member is allowed to come into contact with the second lens group.

It is desirable that at least either the first lens group or the second lens group move while rotating around the optical axis and that the sliding member be provided at, at least, the other end of the light leakage preventing member or the second lens group in order to reduce the extent of friction occurring at the contact surface where the other end of the light leakage preventing member and the second lens group come into contact with each other.

The first lens group is capable of moving as it rotates around the optical axis during a focusing operation.

It is desirable that the sliding member be provided at the other end of the light leakage preventing member.

The other end of the light leakage preventing member may be allowed to become detached from the second lens group when the bellows are expanded. It is desirable that the length of the light leakage preventing member when the bellows are expanded be equal to or larger than half the maximum distance between the first lens group and the second lens group.

The light leakage preventing member is capable of expanding through a self-restorative power as the distance between the first lens group and the second lens group lengthens.

It is desirable that the first lens group be provided toward the subject along the optical axis.

It is desirable that the shading device further include an air pressure adjustment device that performs an air pressure adjustment for an interior space formed by the first lens group, the second lens group and the light leakage preventing member and the space outside the interior space as the distance between the first lens group and the second lens group increases/decreases while the other end of the light leakage preventing member and the second lens group are in contact with each other.

It is desirable that the air pressure adjustment device be constituted as grooves that are formed at a contact surface where the second lens group comes in contact with the other end of the light leakage preventing member and communicates between the interior space and the exterior space when the other end of the light leakage preventing member and the second lens group are in contact with each other.

A lens barrel according to the present invention includes a first lens group and a second lens group that move relative to each other along the optical axis with at least either of the lens groups allowed to rotate around the optical axis and a shading device provided between the first lens group and the second lens group. The shading device includes a plurality of substantially tubular shading members which overlap one another along the optical axis so as to allow the shading device to achieve a telescopic function.

A lens barrel according to the present invention includes a first lens group and a second lens group that move relative to each other along the optical axis with at least either of the lens groups allowed to rotate around the optical axis and a shading device provided between the first lens group and the second lens group. The shading device includes a light leakage preventing member having bellows, with one end of the light leakage preventing member secured to the first lens group and another end of the light leakage preventing member allowed to come in contact with the second lens group.

BRIEF DESCRIPTION OF THE DRAWINGS

FIG. 8 shows the lens barrel in FIG. 7 in a telephoto state; and

FIG. 9 shows air release grooves.

DESCRIPTION OF THE PREFERRED EMBODIMENTS

First Embodiment

Figure 1:
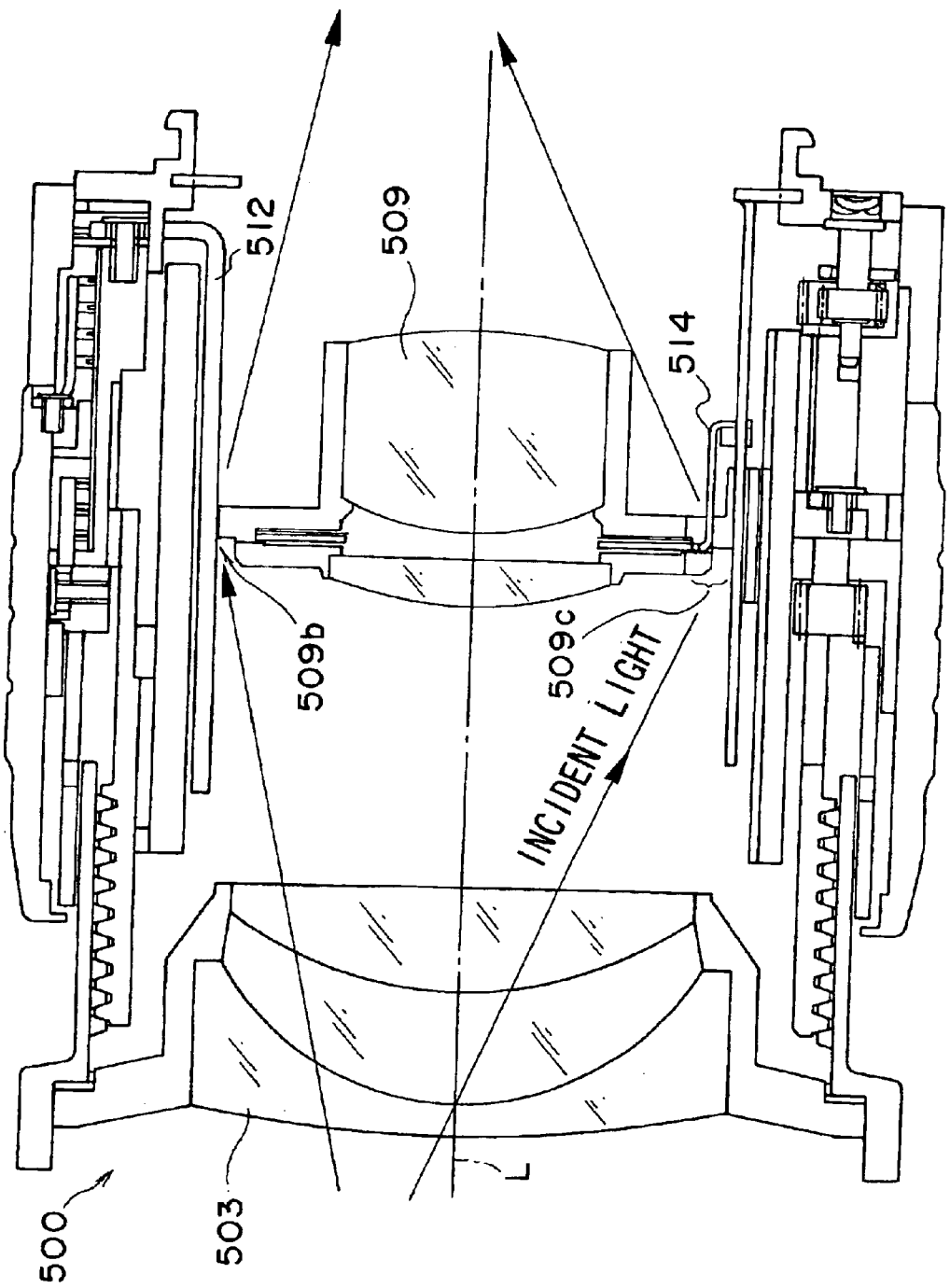
FIG. 1 illustrates a light leakage phenomenon occurring in a lens barrel.

First, a light leakage phenomenon occurring in a lens barrel is briefly explained. FIG. 1 is a sectional side view of a standard lens barrel.

This lens barrel 500 includes a front lens group 503 and a rear lens group 509. The front lens group 503 moves along an optical axis L while rotating around the optical axis L during a focal adjustment. The rear lens group 509 moves along the optical axis L during a zooming operation. At the rear lens group 509, a plurality of notches 509b and 509c through which a key 512 and the like, for guiding the rear lens group 509 along a rectilinear pass, a lever 514 operated to engage an aperture mechanism in operation and the like are provided.

Light La having passed through the lenses in the front lens group 503 may sometimes reach the rear of the rear lens group 509, i.e., the right side in FIG. 1, through the clearances at the notches 509b, 509c or the like without passing through the lenses in the rear lens group 509. This phenomenon is referred to as a light leakage phenomenon. A shading device is provided in the lens barrel in order to prevent this light leakage phenomenon.

The following is a detailed explanation of the shading device achieved in the first embodiment of the present invention, given in reference to the drawings.

Figure 2:
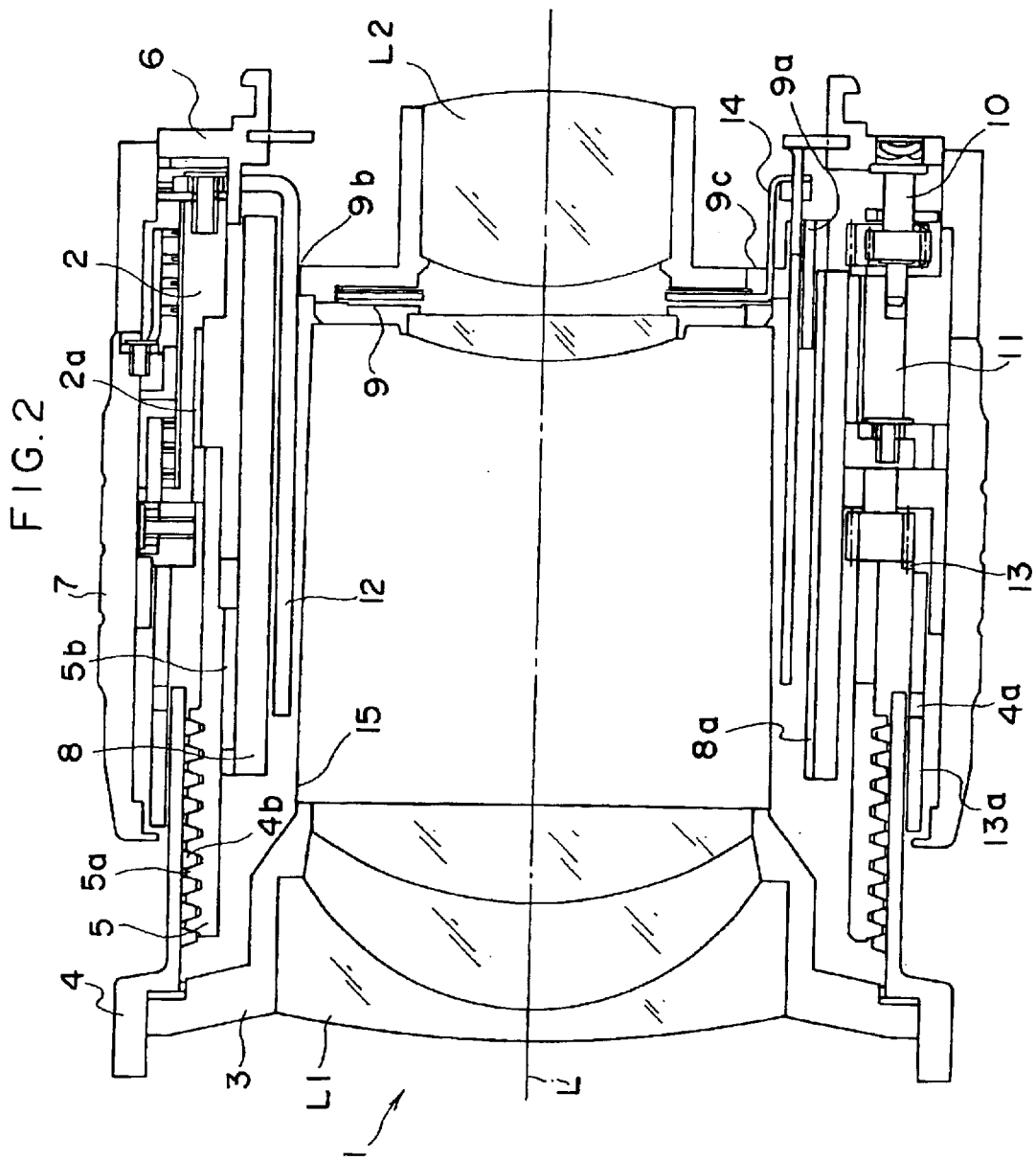
FIG. 2 is a sectional side view of a lens barrel having the shading device achieved in a first embodiment of the present invention.

FIG. 2 is a side elevation of a section of a lens barrel having the shading device achieved in the first embodiment of the present invention. As shown in FIG. 2, a lens barrel 1 includes a fixed barrel 2, a front lens group L1, a range ring 4, a helicoid ring 5, a bayonet mount 6, a zoom ring 7, a cam barrel 8, a rear lens groups L2 and the like. The lens barrel 1 further includes a shading device 15 provided to prevent light leakage. The shading device 15 is to be described in detail later.

The fixed barrel 2 includes a rectilinear guide unit 2a that guides the helicoid ring 5 and the like, with the bayonet mount 6 mounted at one end of the fixed barrel 2. The bayonet mount 6 can be detachably mounted at a mount provided at a camera body (not shown). The lens barrel 1 is mounted at the camera body (not shown) via the bayonet mount 6.

The front lens group L1 is a focusing lens group provided toward the subject along the optical axis, which moves along the optical axis L during a focusing operation. The front lens group L1 is supported by the range ring 4 via a front group holding frame 3. The range ring 4 includes a helicoid 4b formed on the internal circumferential side to interlock with the helicoid ring 5. As the range ring 4 is rotated around the optical axis L, the range ring 4 and the front lens group L1 supported at the range ring 4 are allowed to move along the optical axis via the helicoid 4b. As a result, a focusing operation is performed. It is to be noted that the front lens group L1 rotates together with the range ring 4 around the optical axis L.

The helicoid ring 5 includes a helicoid 5a formed on its external circumferential side to interlock with the helicoid 4b at the range ring 4 and a projecting cam 5b formed on its internal circumferential side. The helicoid ring 5, the range ring 4 and the front lens group L1 are allowed to move along the optical axis L by the projecting cam 5b and the rectilinear guide unit 2a at the fixed barrel 2.

The rear lens group L2 moves along the optical axis L during a zooming operation. The rear lens group L2 is guided by a rectilinear key 12 secured to the fixed barrel 2 so as to engage in a rectilinear motion. The rear lens group L2 is supported by a rear group holding frame 9. A groove 9a is provided on the external circumferential side of the rear group holding frame 9. A plurality of notches 9b, 9c and the like through which the rectilinear key 12, a lever 14 operated to engage an aperture mechanism (not shown) in operation and the like pass are provided at the rear lens group L2.

The zoom ring 7 is an operating member rotatably provided at the fixed barrel 2. As the zoom ring 7 is rotated, the cam barrel 8 is caused to rotate around the optical axis L via a pin, a cam and the like. A cam groove 8a is formed on the internal circumferential side of the cam barrel 8. The cam groove 8a at the cam barrel 8 and the rectilinear key 12 each interlock with the groove 9a at the rear group holding frame 9. Thus, as the cam barrel 8 rotates, the rear lens group L2 is allowed to move along the optical axis L by the groove 9a and the rectilinear key 12.

The lens barrel 1 includes a driving force communicating mechanism that communicates the driving force imparted from the camera body (not shown) to the range ring 4 so as to achieve autofocusing in response to a command issued from the camera body. In this structure, a coupling gear 10, an idling gear 11 and a segment gear 13, for instance, may constitute the driving force communicating mechanism.

The coupling gear 10, which interlocks with a driving mechanism (not shown) mounted on the camera body side and the idling gear 11, communicates a rotational driving force from the camera body to the idling gear 11. The idling gear 11, which interlocks with the segment gear 13, communicates the driving force communicated from the coupling gear 10 to the segment gear 13. The segment gear 13 is formed in a substantially annular shape and includes a rectilinear key 13a which connects with a guide unit 4a provided at the range ring 4. The segment gear 13 communicates the driving force communicated from the idling gear 11 to the range ring 4.

As the segment gear 13 is caused to rotate by the rotational driving force originating at the camera body which has been communicated by the coupling gear 10 and the idling gear 11, the rectilinear key 13a is also caused to rotate which, in turn, causes the range ring 4 to rotate as well via the guide unit 4a. The rotation of the range ring 4 causes the range ring 4 and the front lens group L1 to move along the optical axis L. Thus, a focal adjustment is achieved by driving the front lens group L1 through control implemented from the camera body.

Figure 3:
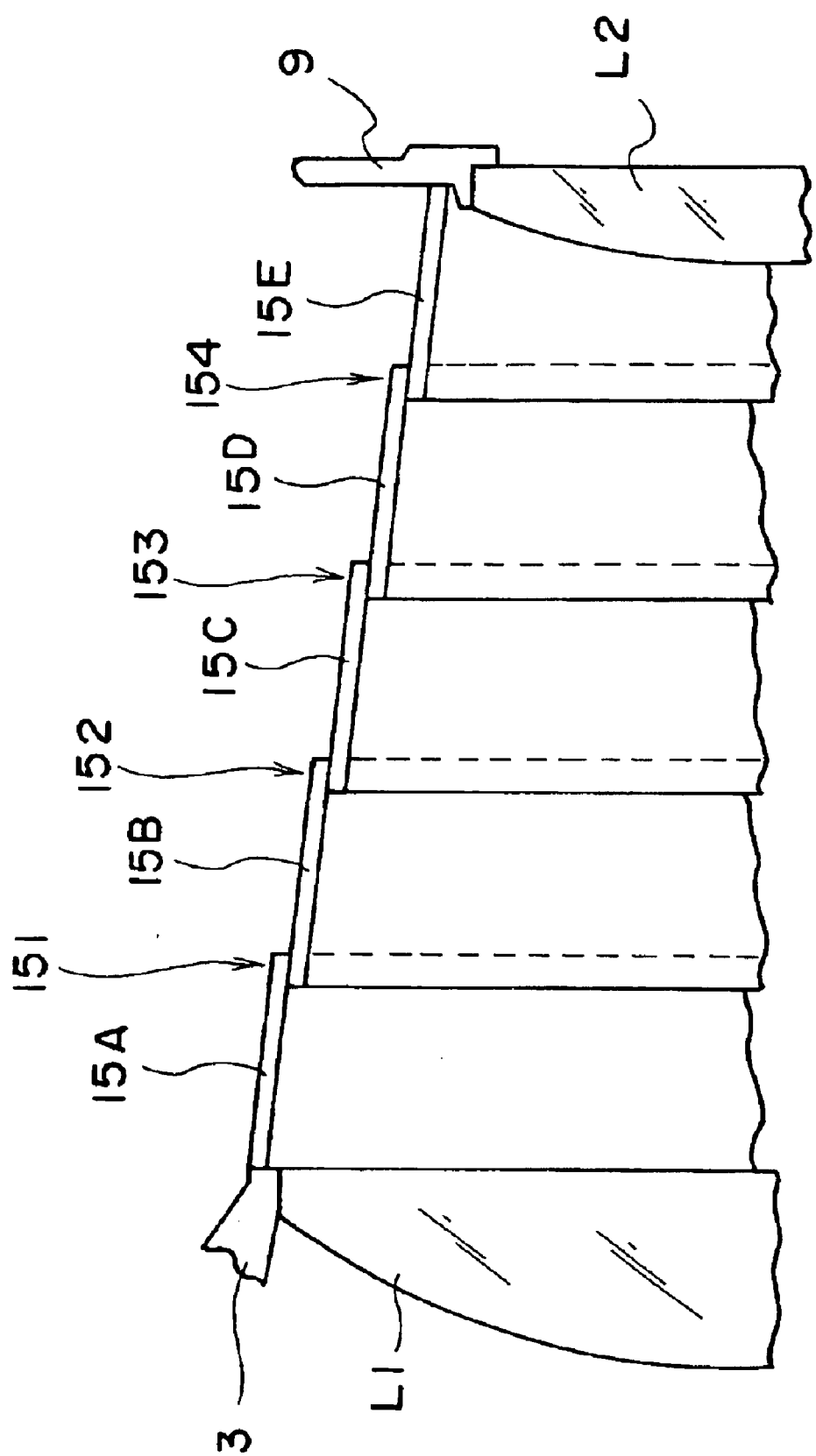
FIG. 3 shows in detail the structure of the shading device.

Next, the shading device 15 provided at the lens barrel 1 to prevent the light leakage phenomenon described earlier is explained in detail. FIG. 3 is a sectional view of a portion of the shading device 15. It is to be noted that the illustration in FIG. 3 is exaggerated to facilitate an explanation of the structure of the shading device 15.

As shown in FIG. 3, the shading device 15 is constituted by combining a plurality of shading members 15A, 15B, 15C, 15D and 15E. The shading members 15A~15E are each constituted of a thin sheet having a light-shading property, e.g., a black resin sheet. One end of the shading member 15A is secured to the front group holding frame 3 which holds the front lens group L1. In addition, one end of the shading member 15E is secured to the rear group holding frame 9 holding the rear lens group L2. The shading members 15B, 15C and 15D fitted between the shading members 15A and 15E are allowed to slide and rotate. The shading device 15 is capable of expanding/contracting as the front lens group L1 and the rear lens group L2 move. Namely, the shading device 15 constituted with a plurality of shading members 15A~15E achieves a telescopic function.

The shading members 15A~15E are each formed in a tapered tubular shape having different diameters at the two sides. Namely, the shading members 15A~15E are each formed as part of a substantially circular-conical tube, with the external circumferential surfaces and the internal circumferential surfaces of the shading members 15A~15E each formed as a substantially circular-conical surface. The shading members 15A~15E are set so that the orientations of the individual circular-conical surfaces match. In other words, they are set so that the vertices of the individual circular cones face the same direction and the diameters of the individual shading members become smaller along the same direction. As a result, the overall shading device 15 takes on the shape of a portion of a substantially circular cone, i.e., a tapered shape.

In FIG. 3, the shading members 15A~15E are set so that their larger-diameter sides face toward the front lens group L1 and their smaller-diameter sides face toward the rear lens group L2. Thus, the larger-diameter side of the shading member 15A is secured to the front lens group L1 and the smaller-diameter side of the shading member 15E is secured to the rear lens group L2, which has a smaller lens diameter than that of the front lens group. By orienting the shading members 15A~15E as shown in FIG. 3, the shading device 15 can be effectively miniaturized. This ultimately achieves a more compact lens barrel 1.

As shown in FIG. 3, the larger-diameter sides of the shading members 15A~15E are inserted at the smaller-diameter sides of the adjacent shading members. It is to be noted that the shading members provided between the shading member 15A and the shading member 15E are not secured to any member. Thus, the shading members 15B~15D provided between the shading members 15A and 15E are allowed to slide to cause expansion/contraction of the light leakage preventing member 15 along the optical axis L. In this structure, the larger-diameter sides of the shading members that are inserted at the adjacent shading members are set larger than the smaller-diameter sides of the shading members at which they are inserted in order to prevent the shading members 15B ~15D from becoming disengaged when the light leakage preventing member expands/contracts.

Figure 4:
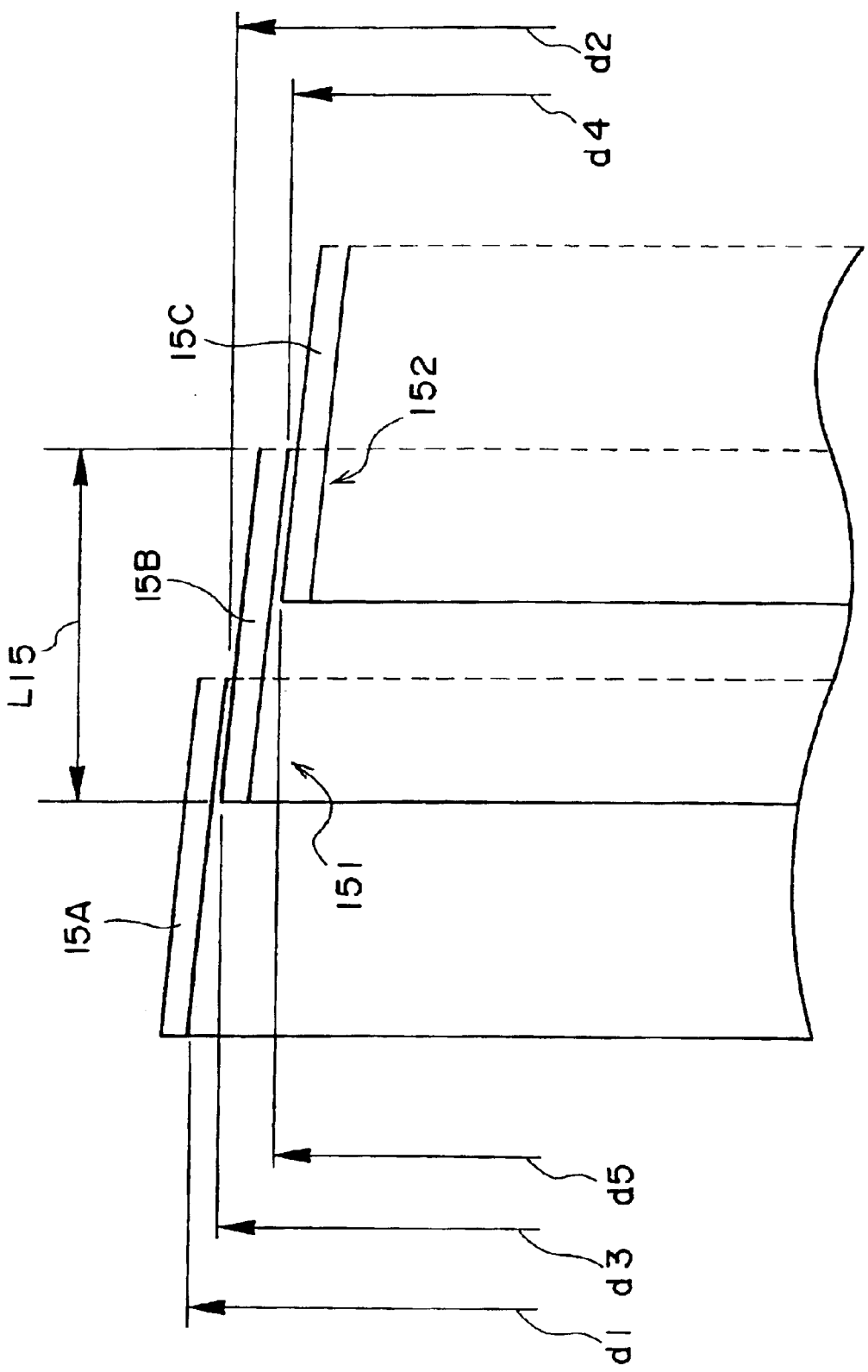
FIG. 4 is a partial enlargement of the shading device shown in FIG. 3.

FIG. 4 is provided to facilitate an explanation of the relationships achieved with regard to the dimensions of the shading members. FIG. 4 shows the relationships among the shading members 15A~15C, as an example. As shown in FIG. 4, the internal diameter d1 on the larger-diameter side of the 15A is larger than the external diameter d3 on the larger-diameter side of the shading member 15B, and the internal diameter d2 on the smaller-diameter side of the shading member 15A is smaller than the external diameter d3 on the larger-diameter side of the shading member 15B. The internal diameter d1 on the larger-diameter side and the internal diameter d2 on the smaller-diameter side of the shading member 15A, the external diameter d3 on the larger-diameter side and the internal diameter d4 on the smaller-diameter side of the shading member 15B and the external diameter d5 on the larger-diameter side of the shading member 15C achieve the following relationships; d1 >d3>d2>d5>d4. It is to be noted that these diameters d1~d5 are set as appropriate so that the retaining portions to be detailed later function effectively even when the shading device 15 is in a most expanded state or in a most contracted state.

By setting the dimensions of the individual shading members 15A~15C in this manner, it is ensured that the shading member 15B inserted at the shading member 15A and the shading member 15C inserted at the shading member 15B do not become disengaged. An area 151 over which the internal circumferential surface of the shading member 15A and the external circumferential surface of the shading member 15B overlap and an area 152 over which the internal circumferential surface of the shading member 15B and the external circumferential surface of the shading member 15C overlap each other function as retaining portions. While the dimensional relationships among the shading members 15A~15C are explained here as an example, the shading members 15C~15E also achieve similar dimensional relationships.

As shown in FIG. 3, disengagement of the shading members 15B~15D is prevented by the overlapping portions of the individual shading members 15A~15E, i.e., by retaining portions 151~154.

Figure 5:
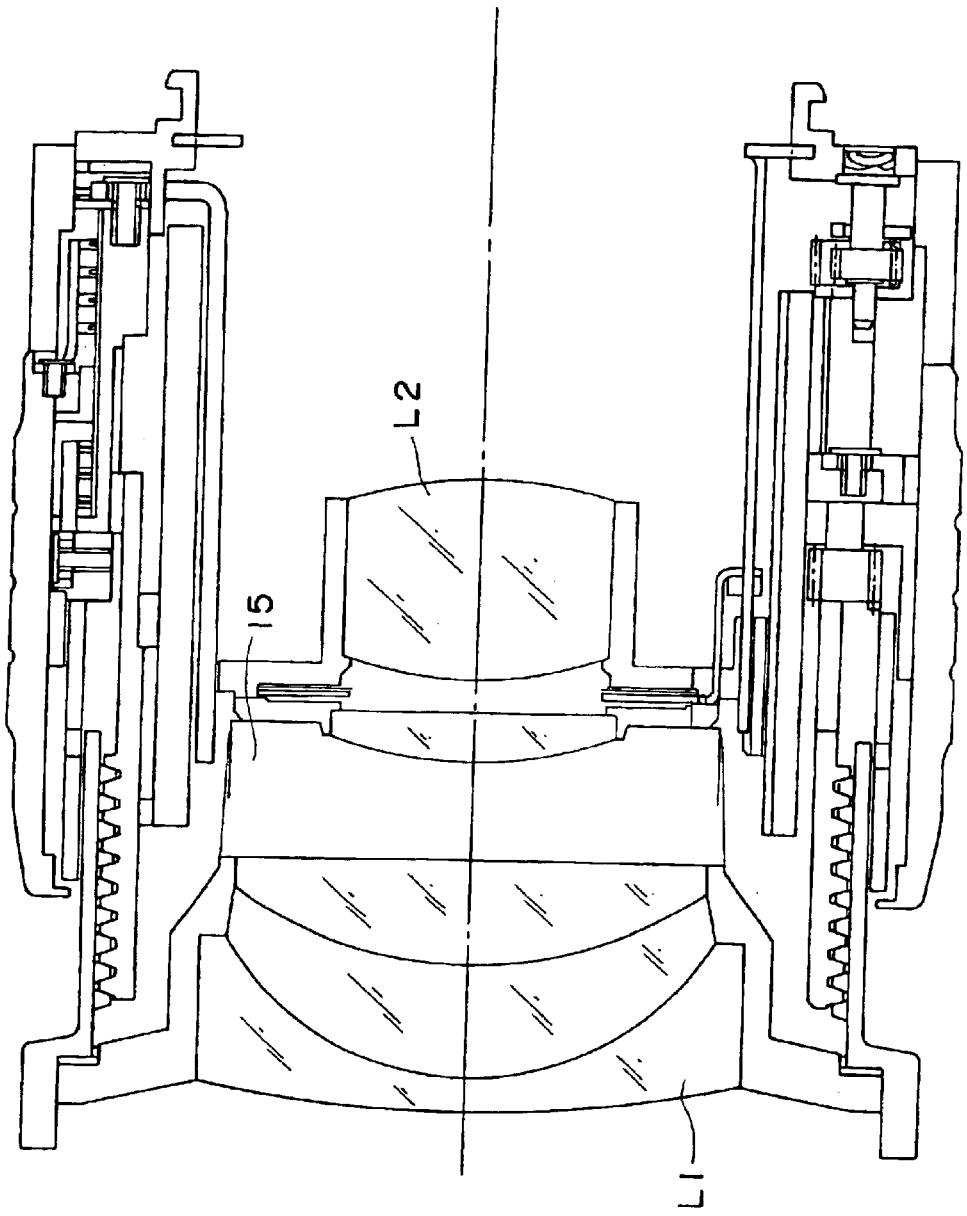
FIG. 5 illustrates the lens barrel in FIG. 2 in a state in which the distance between lens groups is smaller.

FIG. 5 shows a sectional view taken at a side of the lens barrel 1 in a state in which the distance between the front lens group L1 and the rear lens group L2 has become smaller. As the distance between the front and rear lens groups L1 and L2 becomes smaller, the shading members 15B~15E move further into the shading members adjacent to them toward the front lens group L1, i.e., the shading members with larger internal diameters and, as a result, the shading device 15 becomes contracted along the optical axis L. When the shading device 15 is in the most contracted state, its length almost matches the length L15 of a single shading member, as shown in FIG. 4. It is to be noted that the lengths of the individual shading members 15A~15E along the optical axis L are substantially equal to the one another.

By setting the dimensions of the shading members 15A~15E as appropriate as explained earlier, the individual shading members 15A~15E are allowed to overlap each other to assure the effectiveness of the retaining portions 151~154 even when the shading device 15 is in an expanded state or in a contracted state. Thus, no gap is formed in the shading device 15 and leakage of light that would otherwise occur between the front lens group L1 and the rear lens group L2 is prevented with a high degree of reliability. It is to be noted that since the shading members 15B~15D are not fixed, the shading device 15 is allowed to expand/contract smoothly, unaffected by the rotation of the front lens group L1.

As described above, the light leakage preventing member 15, which is constituted by fitting together the shading members 15A~15E, is capable of expanding/contracting smoothly even when the front lens group L1 rotates and moves during a focusing operation or when the rear lens group L2 moves during a zooming operation. As a result, reliable shading is achieved.

Since the shading members 15A~15E are each formed by using a thin sheet material, an inexpensive, compact and lightweight shading device 15 is achieved.

It is to be noted that while the shading device 15 is constituted by combining five shading members 15A~15E in the embodiment described above, the present invention is not limited to this example. For instance, the number of shading members may be smaller or larger.

Figure 6:
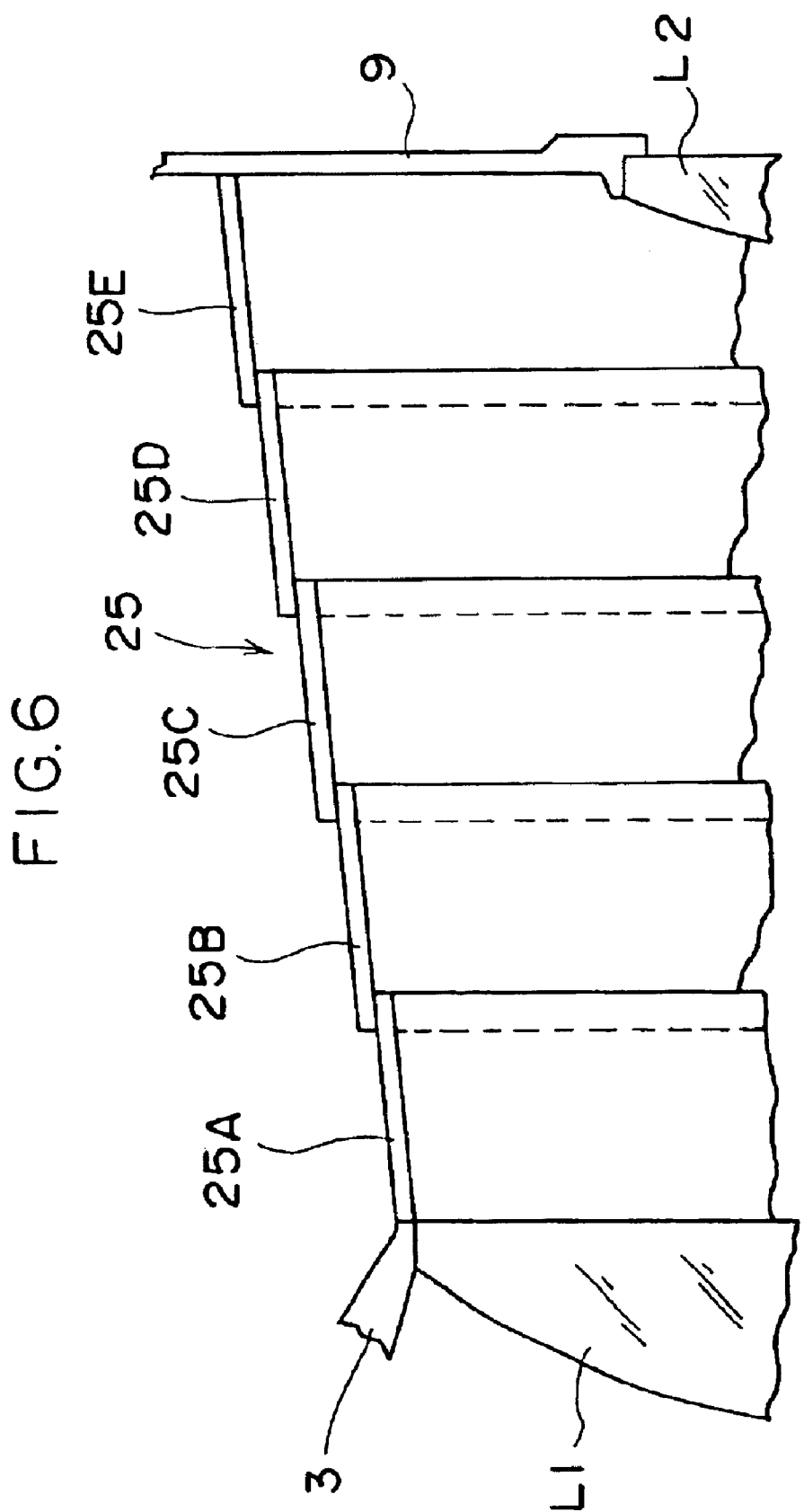
FIG. 6 shows an example of a variation of the shading device.

In the embodiment, the larger-diameter side of the shading device 15 is set on the side where light originates, i.e., on the side toward the subject of the lens barrel 1 mounted at the camera body. However, the present invention is not limited to this example and the smaller-diameter side of a shading device 25 may be set toward the side where light originates, i.e., toward the subject, as shown in FIG. 6 instead. In such a case, the dimensions of the external diameters and the internal diameters of individual shading members 25A~25E do not need to be set with high precision and light leakage can still be reliably prevented. In other words, even if the clearances between the internal circumferential surfaces and the external circumferential surfaces of the shading members 25A~25E become fairly significant, the light originating from the subject does not pass through these clearances to reach the rear of the rear lens group L2.

In addition, while the shading members 15A~15E in the embodiment are each formed as a tube assuming a substantially circular-conical shape, they may adopt a different shape as long as the shading device 15 achieves a telescopic function. For instance, if no lens group rotates, the shading members 15A~15E may each be formed as a tube assuming a substantially pyramidal shape.

In the embodiment explained above, disengagement of the shading members is prevented by the retaining portions achieved by taking advantage of the dimensional differences between the internal diameters and the external diameters of the individual shading members. However, the present invention is not limited to this example, and holding members that hold or retain the individual shading members 15A~15E may be provided or the shading members themselves may be formed so as to hold each other, instead. In either of those cases, too, disengagement of the shading members 15A~15E can be prevented with a high degree of reliability.

A resin material molded in a tubular shape may be used to constitute each of the shading members 15A~15E instead of a thin sheet material achieving a cylindrical shape.

The following advantages are achieved in the first embodiment explained above.

The shading device 15 achieved in the first embodiment includes a plurality of shading members 15A~15E overlapping each other along the direction in which the optical axis extends. Since the shading device 15 is constituted with a plurality of shading members 15A~15E so as to achieve a telescopic function, light leakage can be reliably prevented even when the front lens group (a first lens group) L1 and the rear lens group (a second lens group) L2 move.

The retaining portions 151~154 are provided at the unsecured end of the shading member 15A (the first shading member), at the unsecured end of the shading member 15E (the second shading member) and both ends of each of the shading members 15B~15D (the middle shading members). Thus, even when the lens groups L1 and L2 move over a significant distance, disengagement of the middle shading members 15B~15D is prevented, which, in turn, achieves reliable prevention of light leakage.

The shading members 15A~15E are each formed as a tube adopting a substantially circular-conical shape and they are oriented so that the vertices of the individual circular cones face the same direction. The areas over which the internal circumferential surfaces on the smaller-diameter sides of the shading members 15A~15D overlap the external circumferential surfaces on the larger-diameter sides of the shading members 15B~15E respectively adjacent to the shading members 15A~15D function as the retaining portions 151~154. As a result, a simple and inexpensive shading device 15 is achieved.

Since the larger-diameter side of the shading device 15 is fixed at either the front lens group L1 or the rear lens group L2 with a larger lens external diameter, a more compact shading device is achieved to miniaturize the overall lens barrel 1.

By setting the smaller-diameter side of the shading device 15 toward the subject along the direction in which the optical axis extends, light leakage can be reliably prevented even if the clearances between the shading members 15A~15E are relatively large.

The internal diameter d2 at the unsecured end of the shading member 15A is smaller than the external diameter d3 at the end of the shading member 15B overlapping the shading member 15A. The external diameter at the unsecured end of the shading member 15E is larger than the internal diameter at the end of the shading member 15D overlapping the shading member 15E. Thus, disengagement of the shading members 15B ~15D is prevented to achieve a reliable prevention of light leakage.

Since the shading device 15 expands/contracts as the shading members 15A~15E slide in response to the movement of the lens groups L1 and L2, the overall structure is simplified. The length of the shading device 15 along the optical axis when the distance between the lens groups L1 and L2 is at its smallest is substantially equal to the length of a single shading member and, as a result, a more compact shading device 15 is achieved.

Second Embodiment

Next, the shading device achieved in the second embodiment of the present intention to is explained in detail in reference to the drawings.

Figure 7:
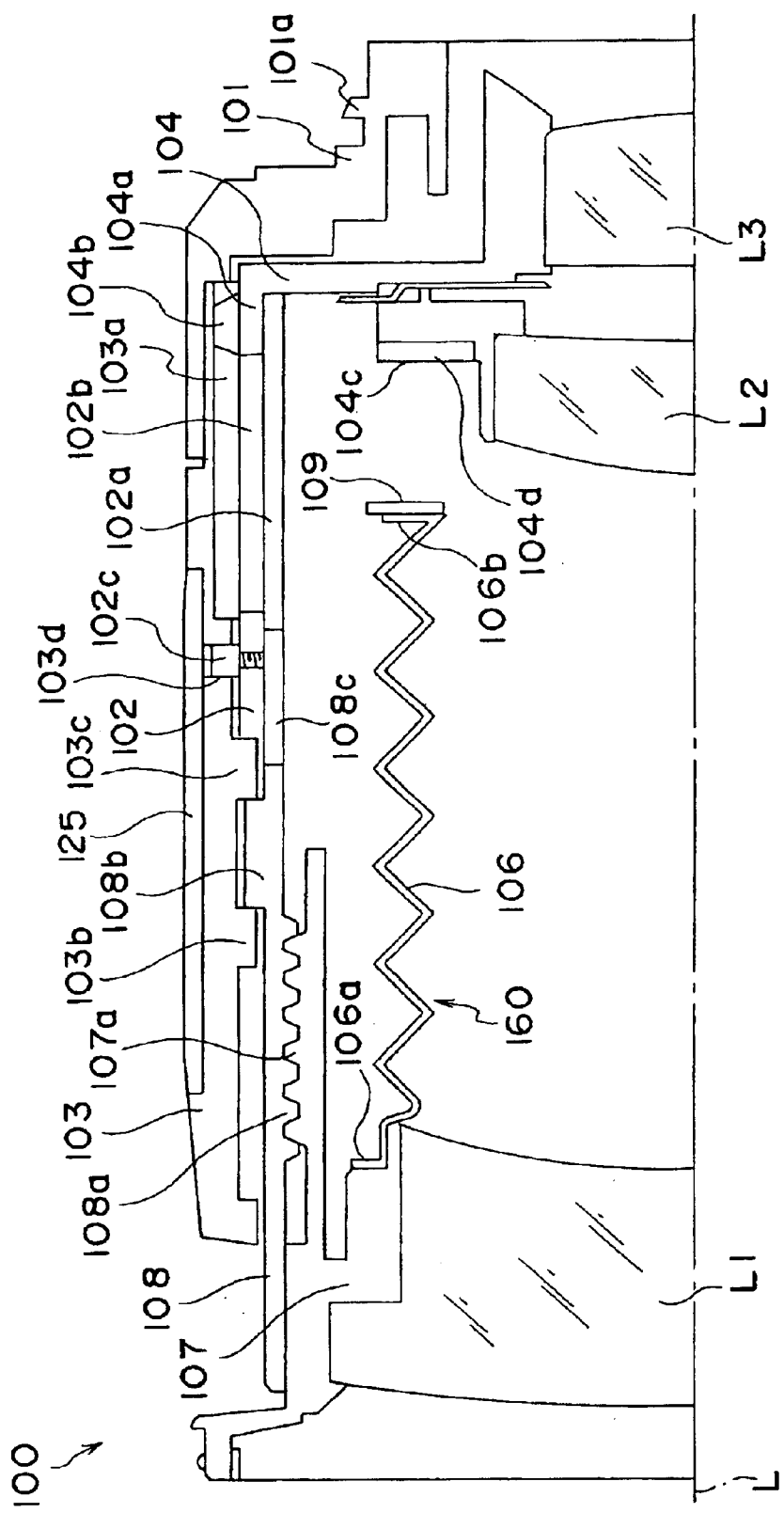
FIG. 7 is a sectional side view of the shading device achieved in a second embodiment of the present invention in a wide-angle state.

FIGS. 7 and 8 are sectional side views of a lens barrel 100 mounted with a shading device 160 achieved in the second embodiment. It is to be noted that FIG. 7 shows the lens barrel 100 with the zoom lens set to the wide position, whereas FIG. 8 shows the lens barrel 100 with the zoom lens set to the telephoto position. Both FIGS. 7 and 8 show only half of the lens barrel 100 through the optical axis L.

As shown in FIGS. 7 and 8, the lens barrel 100 mainly comprise a fixed mount 101, a fixed tube 102, a zoom ring 103, a rear group holding frame 104, a front group holding frame 107 and a drive ring 108. In addition, the lens barrel 100 includes a shading device 160 that prevents light leakage. The shading device 160 is to be described in detail later.

A bayonet portion 101a is provided at the fixed mount 101 which is a male-side fixed member to be mounted at a female mount on the camera body (not shown).

The fixed tube 102 is a fixed portion formed as an integrated part of the fixed mount 101. A rectilinear key groove 102a is provided at three positions on the internal circumferential side of the fixed tube 102. The fixed tube 102 further includes a rectilinear guide groove 102b through which the rear group holding frame 104 is guided, a follower pin 102c which connects with a guide groove 103d to be detailed later and the like.

The zoom ring 103 is an annular member which is rotated around the optical axis L during a zooming operation. The zoom ring 103 includes a guide lead groove 103a, follower pins 103b and 103c, the angular groove (guide groove) 103d and the like. The guide lead groove 103a is fitted with a follower portion 104b provided on the external circumferential side of the rear group holding frame 104. The follower pins 103d and 103c, which project out at three positions on the internal circumferential side of the zoom ring 103, are fitted with a projecting cam 108a of the drive ring 108. The angular groove 103d is a guide groove provided around the optical axis over a range corresponding to the zooming range. A rubber ring 125 covers the external circumference of the zoom ring 103.

The rear group holding frame 104 holds rear lens groups L2 and L3. The rear group holding frame 104 includes rectilinear key portions 104a, the follower portion 104b and the like. The rectilinear key portions 104a are each provided at one of three positions on the external circumferential side of the rear group holding frame 104 and connect with the rectilinear guide groove 102b at the fixed tube 102. The follower portion 104b provided further toward the outside relative to the rectilinear key portion 104a connects with the guide lead groove 103a at the zoom ring 103.

The front group holding frame 107 holds a front lens group L1. A male helicoid 107a is provided on the external circumferential side of the front group holding frame 107 on the right side in the figures, i.e., on the side toward the camera body when the lens barrel 100 is mounted at the camera body.

The drive ring 108 includes a female helicoid 108a, a projecting cam 108b for driving the first lens group, a rectilinear key 108c and the like. The female helicoid 108a, which is provided on the internal circumferential side of the drive ring 108, meshes with the male helicoid 107a. The projecting cam 108b is provided on the external circumferential side of the drive ring 108 on the right side in the figures, and connects with the follower pins 103b and 103c at the zoom ring 103. The rectilinear key 108c, which is provided on the external circumferential side of the drive ring 108 on the right side in the figures at a position achieving an angle along the circumferential direction which is different from the circumferential angle of the projecting cam 108b, is fitted with the rectilinear guide grooves of the fixed tube 102.

The shading device 160 comprises an accordion-folding or bellows member 106, a sliding member 109 and the like. The bellows member 106 is provided between the front lens group L1 and the rear lens groups L2 and L3 in order to prevent light leakage. The bellows member 106, which is achieved as an expandable/contractible tube, may be constituted of, for instance, a rubber containing silicon. As shown in FIG. 7, one end 106a of the bellows member 106 on left side in the figure, i.e., the end toward the subject, is secured to the front group holding frame 107 with an adhesive or the like. The other end 106b of the bellows member 106, on the other hand, is not fixed, and thus is a free end. As described later, the sliding member 109 is secured to the other end 106b of the bellows member 106.

As shown in FIGS. 7 and 8, the bellows member 106 expands/contracts along the optical axis L as the front lens group L1 and the rear lens groups L2 and L3 move. It is to be noted that as shown in FIG. 7, the other end 106b of the bellows member 106 is separated from the rear group holding frame 104 holding the rear lens groups L2 and L3 when the bellows member 106 is expanded to the maximum extent.

Because of the restrictions imposed in the manufacturing process, it is difficult to set the wall thickness of the bellows member 106 to a value smaller than approximately 0.15 mm. This, in turn, imposes a restriction with regard to the number of folds in the bellows member 106 when it is contracted and folded, i.e., the number of articulations. For instance, if the number of articulations at the bellows member 106 increases, the minimum distance between the front lens group L1 and the rear lens groups L2 and L3 also increases. A restriction on the number of articulations imposes a restriction on the length of the bellows member 106 in an expanded state, as well.

Accordingly, the bellows member 106 is made to be apart from the rear group holding frame 104 when it expands in the second embodiment of the present invention. It is particularly effective to allow the bellows member 106 to be apart from the rear group holding frame 104 in the lens barrel 100 with a great focal length range adopting a two-group lens configuration for cost reduction in which the front lens group L1 and the rear lens groups L2 and L3 travel over a long-distance.

The length of the bellows member 106 in an expanded state only needs to be equal to or larger than half of the distance between the lens groups when the front lens group L1 is at the greatest distance from the rear lens groups L2 and L3. More specifically, the length of the bellows member 106 in an expanded state should be set based upon the value representing half the distance between the lens groups and by factoring in the refraction of light having traveled through the front lens group L1.

It may not always be possible to achieve contrast and a so-called ghost may manifest in a photograph taken through a backlit photographing operation, i.e., in a photographing operation performed with a light source present within the photographic range. Accordingly, the bellows member 106 achieving a length equal to or larger than half the distance between the lens groups is provided to cut the light reflected inside the lens barrel 100 over the first half of the distance between the front lens group L1 and the rear lens groups L2 and the L3, i.e., the range toward the front lens group L1. This cuts the light that would otherwise be allowed to enter the edge of the film surface and prevents the ghost phenomenon. It is to be noted that since the light reflected over the second half of the distance, i.e., the range toward the rear lens groups L2 and the L3, is not a factor that greatly contributes to the appearance of the ghost phenomenon, it is not necessary to provide the bellows member 106 in conjunction with the rear lens groups L2 and L3. However, it goes without saying that the end 106b of the bellows member 106 may come into contact with the rear group holding frame 104 when the bellows member 106 is in an expanded state.

By securing the bellows member 106 to the front group holding frame 107, i.e., by fixing the bellows member 106 to the frame further toward the subject along the optical axis, in this manner, it becomes possible to effectively cut light that would otherwise be reflected off the inner wall of the lens barrel 100 in a complex manner.

It is to be noted that the bellows member 106, which is detached from the rear group holding frame 104 when it is in an expanded state, needs to have a self-restorative power. Having such a self-restorative power, the bellows member 106 is able to stretch from the contracted state shown in FIG. 8 to achieve the expanded state shown in FIG. 7 without being pulled by the rear group holding frame 104.

The sliding member 109 is constituted of a doughnut-shaped thin plate bonded to the free end 106b of the bellows member 106 toward the right side in the figures. The sliding member 109 is provided to reduce the friction occurring between the end 106d of the bellows member 106 and a contact surface 104c of the rear group holding frame 104 which comes in contact with the end 106b. As the front group holding frame 107 rotates around the optical axis L during a focussing operation, the bellows member 106 also rotates. During this process, the end 106b of the bellows member 106 slides over the contact surface 104c of the rear group holding frame 104 which does not rotate. By providing the sliding member 109, the end 106b of the bellows member 106 is allowed to slide over to the contact surface 104c of the rear group holding frame 104 more smoothly.

A coefficient of friction of the bellows member 106 constituted of, for instance, a rubber containing silicon is relatively high. Accordingly, the sliding member 109 is formed by using a resin sheet such as a black Mylar (registered trademark) having undergone a lubrication process. It is to be noted that by providing the sliding member 109 at the open end 106b of the bellows member 106, the shape of the bellows member 106 can be stabilized.

The shading device 160 in the second embodiment of the present invention further includes an air pressure adjustment device. When the bellows member 106 expands/contracts, the air pressure within the space formed by the bellows member 106 and the front and rear lens groups L1, L2 and L3 becomes different from the air pressure outside the interior space. By providing the air pressure adjustment device to adjust the air pressure in the interior space and the air pressure in the exterior space, the operational ease with which the lens groups are driven, i.e., the operability, can be improved. The following is a detailed explanation of the air pressure adjustment device.

FIG. 9 shows the rear group holding frame 104 viewed from the side where the front lens group L1 is present, i.e., from the left side in FIG. 7. As shown in FIG. 9, a plurality of air release grooves 104d, e.g., six air release grooves in this example, are provided at the contact surface 104c of the rear group holding frame 104. The air release grooves 104d constitute the air pressure adjustment device that adjusts the air pressure in the interior space formed by the front and rear lens groups L1, L2 and L3 and the bellows member 106 and the air pressure in the exterior space as the distance between the front lens group L1 and the rear lens groups L2 and L3 increases/decreases while the contact surface 104c of the rear group holding frame 104 and the sliding member 109 at the bellows member 106 are in contact with each other.

If the distance between the front lens group L1 and the rear lens groups L2 and L3 changes and, more specifically, if the distance becomes smaller during a focussing operation or a zooming operation, the air compressed and caused to move by the bellows member 106 flows out to the exterior space through the release grooves 104d. If, on the other hand, the distance between the front lens group L1 and the rear lens groups L2 and L3 becomes larger the outer air flows into the interior space through the release grooves 104d. Thus, the operational ease during a focussing operation and a zooming operation improves. The presence of the release grooves 104d is particularly effective when performing a zooming operation by manually rotating the zoom ring 103, since the distance between the lens groups changes quickly in such a situation.

Next, the operations of the lens barrel 100 and the shading device 160 achieved in the second embodiment of the present invention are explained.

As the zoom ring 103 is rotated around the optical axis L, the zoom cam 108b for driving the front lens group L1, the projections 103b and 103c provided on the internal circumferential side of the zoom ring 103 so as to connect with the cam 108b by clamping the cam 108b between them and the rectilinear guide grooves 102a at the fixed tube 102 connecting with the rectilinear key 108c cause the front lens group L1 to move along the optical axis L for zooming drive.

In addition, by rotating the zoom ring 103 around the optical axis L, the rectilinear key portions 104a at the rear group holding frame 104 become connected with the rectilinear guide groove 102b provided at the fixed tube 102, and since the follower portion 104b provided further outward relative to the rectilinear key portions 104a is connected with the guide lead groove 103a at the zoom ring 103, the rear lens groups L2 and L3 are caused to move along the optical axis L to achieve zooming drive.

It is to be noted that the front lens group L1, which functions as a focussing lens group, moves along the optical axis L to engage in a focussing operation as the front group holding frame 107 rotates to drive the male helicoid 107a and the female helicoid 108a. Since the rectilinear key 108c of the drive ring 108 is connected with the rectilinear guide grooves 102a at the locking tube 102 and a helicoid connection is achieved between the drive ring 108 and the front group holding frame 107, the front lens group L1 is allowed to move along the optical axis L as the front group holding frame 107 rotates.

As described above, the end 106a of the bellows member 106 in the shading device 160 is secured to the front group holding frame 107 which rotates relative to the rear group holding frame 104. As the distance between the front lens group L1 and the rear lens groups L2 and L3 becomes smaller, the bellows member 106 which is pressed by the front and rear lens groups L1, L2 and L3 contracts. On the other hand, as the distance between the front lens group L1 and the rear lens groups L2 and L3 becomes larger, the bellows member 106 expands with its own restorative power. Even after the bellows member 106 becomes detached from the rear lens groups L2 and L3, the bellows member 106 continues to expand until a predetermined length is achieved. Since the sliding member 109 is adhered at the unsecured end 106b of the bellows member 106, the friction between the end 106b of the bellows member 106 and the contact surface 104c over which the end 106b and the rear lens groups L2 and L3 come in contact with each other is reduced when the front lens group L1 and the bellows member 106 rotate while the bellows member 106 are in contact with the rear lens groups L2 and L3. It is to be noted that the bellows member 106 is capable of freely expanding/contracting and that only the pitch of the bellows member 106 changes while the front and rear lens groups L1, L2 and L3 move. The features described above enable smooth zooming and focussing.

Since the air release grooves 104d are provided at the contact surface 104c at the rear group holding frame 104, the air is allowed to move quickly and reliably between the front and rear lens groups L1, L2 and L3, especially during a zooming operation.

It is to be noted that while the bellows member 106 is secured to the front group holding frame 107 in the embodiment described above, the bellows member 106 may instead be secured to the second holding frame 104. In such a case, the sliding member 109 should be mounted at the end of the bellows member 106 toward the front group holding frame 107 to allow contact between the sliding member 109 and the front group holding frame 107. However, light leakage can be more effectively prevented by securing the bellows member 106 to the front group holding frame 107 since the light having passed through the front lens group L1 is cut over the range corresponding to the first half, i.e., over the range further toward the subject along the optical axis.

The contact surface 104c of the rear group holding frame 104 may be constituted of any material and may be a molded surface or a metal surface, as long as the contact surface 104c includes a flat surface which comes in contact with the sliding member 109 and the release grooves 104b to function as an air pressure adjustment device.

The following advantages are achieved in the second embodiment explained above.

The shading device 160 includes the light leakage preventing member 106 having accordion folds or bellows, with one end 106a thereof secured to the front lens group (the first lens group) L1 and the other end 106b thereof placed in contact with the rear lens groups (the second lens groups) L2 and L3. Thus, even when the lens groups L1, L2 and L3 travel over a great distance, it is possible to reliably prevent leakage of light from the lens groups by taking advantage of the expansion/contraction achieved by the accordion folds of the light leakage preventing member which does not require a large housing.

The sliding member 109 is provided to reduce the friction between the other end 106b of the light leakage preventing member 106 and the contact surface 104c. As a result, even when any of the lens groups L1, L2 and L3 is rotating, the other end 106b and the contact surface 104c are allowed to rotate by sliding against each other smoothly.

The length of the bellows member 106 when it is expanded along the direction of the optical axis is equal to or larger than half the maximum distance between the lens groups. This reduces the occurrence of the ghost phenomenon attributable to light reflected inside the lens barrel 100. Since the bellows member 106 expands through its own restorative power, it is not necessary to provide a mechanism for expanding the bellows member 106 even when the bellows member 106 is detached from the rear lens groups L2 and L3.

The air pressure adjustment device 104d that adjusts the air pressure in the interior space formed by the bellows member 106 and the front and rear lens groups L1, L2 and L3 and the air pressure in the exterior space is provided. As a result, the air is allowed to move quickly when the distance between the lens groups changes while the other end 106b of the bellows member 106 is in contact with the rear lens groups L2 and L3, thereby improving the ease with which the lens barrel 100 is operated. The air pressure adjustment device is constituted by providing a plurality of air release grooves 104d at the contact surface 104c which comes in contact with the bellows member 106. Thus, the air pressure adjustment is achieved through a simple structure.

The above described embodiments are examples, and various modifications can be made without departing from the spirit and scope of the invention.

What is claimed is:

1. A shading device, employed in a lens barrel that includes a plurality of lens groups, comprising:
   a plurality of substantially tubular shading members provided between a first lens group and a second lens group that move relative to each other along an optical axis and overlap each other along the optical axis so as to allow the shading device to achieve a telescopic function.

2. A shading device according to claim 1, wherein:
   the shading members include a first shading member having one end thereof secured to the first lens group, a second shading member having one end thereof secured to the second lens group and at least one middle shading member provided between the first shading member and the second shading member; and
   retaining portions that prevents the middle shading member from being disengaged are provided at an unsecured end of the first shading member, an unsecured end of the second shading member and both ends of the middle shading member.

3. A shading device according to claim 2, wherein:
   the shading members are each formed as a tube having a substantially circular-conical shape and are arranged so that the vertices of the individual circular cones face a same direction; and
   areas over which internal circumferential surfaces on smaller-diameter sides of the shading members overlap external circumferential surfaces on larger-diameter sides of adjacent shading members function as retaining portions.

4. A shading device according to claim 3, wherein:
   the shading device as a whole achieves a substantially circular-conical tubular form constituted of the plurality of shading members; and
   a larger-diameter side of the shading device is set at one of the first lens group and the second lens group with a larger lens external diameter.

5. A shading device according to claim 3, wherein:
the shading device as a whole achieves a substantially circular-conical tubular form constituted of the plurality of shading members; and
a smaller-diameter side of the shading device is set toward a subject along the optical axis.

6. A shading device according to claim 2, wherein:
an internal diameter of the unsecured end of the first shading member is set smaller than an external diameter of the middle shading member at an end overlapping the first shading member; and
an external diameter of the unsecured end of the second shading member is set larger than the internal diameter of the middle shading member at an end overlapping the second shading member.

7. A shading device according to claim 6, wherein:
as a distance between the first lens group and the second lens group becomes smaller, the second shading member is inserted further into the middle shading member and the middle shading member is inserted into the first shading member to contract the shading device, and
as the distance between the first lens group and the second lens group becomes larger, the second shading member is pulled outward from the middle shading member and the middle shading member is pulled outward from the first shading member to expand the shading device.

8. A shading device according to claim 1, wherein:
at least one of the first lens group and the second lens group move while rotating around the optical axis; and
the plurality of shading members are capable of rotating while sliding against each other.

9. A shading device according to claim 1, wherein:
when a distance between the first lens group and the second lens group is at its smallest, a length of the shading device along the optical axis is substantially equal to a length of one of the shading members along the optical axis.

10. A lens barrel comprising:
a first lens group and a second lens group that move relative to each other along an optical axis, with at least one of the first lens group and the second lens group allowed to rotate around the optical axis; and
a shading device according to claim 1.

11. A shading device employed in a lens barrel that includes a plurality of lens groups, comprising:
a light leakage preventing member having bellows provided between a first lens group and a second lens group that move relative to each other along an optical axis, wherein:
one end of the light leakage preventing member is secured to the first lens group and another end of the light leakage preventing member is allowed to come into contact with the second lens group.

12. A shading device according to claim 11, wherein:
at least one of the first lens group and the second lens group move while rotating around the optical axis; and
a sliding member is provided at, at least, one of the other end of the light leakage preventing member and the second lens group in order to reduce an extent of friction occurring at a contact surface where the other end of the light leakage preventing member and the second lens group come into contact with each other.

13. A shading device according to claim 12, wherein:
the first lens group moves while rotating around the optical axis during a focusing operation.

14. A shading device according to claim 13, wherein:
the sliding member is provided at the other end of the light leakage preventing member.

15. A shading device according to claim 11, wherein:
the other end of the light leakage preventing member is detached from the second lens group when the bellows are expanded.

16. A shading device according to claim 15, wherein:
an expanded length of the light leakage preventing member when the bellows are expanded is equal to or larger than half the maximum distance between the first lens group and the second lens group.

17. A shading device according to claim 16, wherein:
the light leakage preventing member expands through a self-restorative power thereof as the distance between the first lens group and the second lens group increases until the light leakage preventing member achieves the expanded length.

18. A shading device according to claim 15, wherein:
the light leakage preventing member expands through a self-restorative power thereof as a distance between the first lens group and the second lens group increases.

19. A shading device according to claim 15, wherein:
the first lens group is provided toward a subject along the optical axis.

20. A shading device according to claim 11, further comprising:
an air pressure adjustment device that performs an air pressure adjustment for an interior space formed by the first lens group, the second lens group and the light leakage preventing member and an exterior space outside the interior space as a distance between the first lens group and the second lens group increases/decreases while the other end of the light leakage preventing member and the second lens group are in contact with each other.

21. A shading device according to claim 20, wherein:
the air pressure adjustment device is constituted as a groove that is fanned at a contact surface of the second lens group which comes in contact with the other end of the light leakage preventing member and that communicates between the interior space and the exterior space when the other end of the light leakage preventing member and the second lens group are in contact with each other.

22. A lens barrel comprising:
a first lens group and a second lens group that move relative to each other along an optical axis, with at least one of the first lens group and the second lens group allowed to rotate around the optical axis; and
a shading device according to claim 11.

23. A shading device employed in a lens barrel having at least a first lens group and a second lens group which move relative to each other along an optical axis with at least one of the first lens group and the second lens group allowed to rotate around the optical axis, comprising:
a first shading member having one end thereof secured to the first lens group, a second shading member having one end thereof secured to the second lens group and at least one middle shading member provided between the first shading member and the second shading member, wherein:
the first shading member, the second shading member and the middle shading member are each formed as a tube adopting a substantially circular-conical shape so as to allow the shading device to achieve a telescopic function and are set to overlap each other along the optical axis so that vertices of the circular cones face a same direction; and areas over which internal circumferential surfaces on smaller-diameter sides of the shading members overlap external circumferential surfaces on larger-diameter sides of adjacent shading members function as retaining portions which prevent disengagement of the middle shading member.

24. A shading device according to claim 23, wherein:

a larger-diameter side of the shading device is set at one of the first lens group and the second lens group with a larger lens diameter.

25. A shading device employed in a lens barrel having at least a first lens group and a second lens group which move relative to each other along an optical axis with at least one of the first lens group and the second lens group allowed to rotate around the optical axis, comprising;

a light leakage preventing member with bellows provided between the first lens group and the second lens group, wherein:

one end of the light leakage preventing member is secured to the first lens group set further toward a subject along the optical axis and another end of the light leakage preventing member is allowed to come into contact with the second lens group;

a sliding member is provided at the other end of the light leakage preventing member to reduce friction between the other end and the second lens group; and a contact surface where the second lens group comes in contact with the other end of the light leakage preventing member includes a groove through which an adjustment of an air pressure in an interior space formed by the first lens group, the second lens group and the light leakage preventing member and an air pressure in an exterior space outside the interior space is achieved when a distance between the first lens group and the second lens group increases/decreases.

26. A shading device according to claim 25, wherein:

the other end of the light leakage preventing member becomes detached from the second lens group when the bellows are expanded through a self-restorative power thereof, and an expanded length of the light leakage preventing member in an expanded state is equal to or larger than half the maximum distance between the first lens group and the second lens group.

27. A shading device employed in a lens barrel that includes a plurality of lens groups, comprising:

a light leakage preventing member having bellows provided between a first lens group and a second lens group that move relative to each other along an optical axis, wherein:

one end of the light leakage preventing member is secured to the first lens group and another end of the light leakage preventing member is not secured to the second lens group.

* * * * *